Oct. 16, 1934.   R. A. BLUNT   1,977,300
SEGREGATION ELIMINATOR
Filed Aug. 30, 1932   2 Sheets-Sheet 2
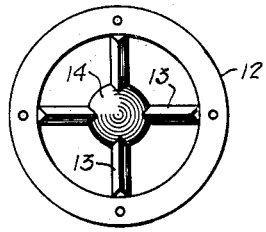
Fig. 3
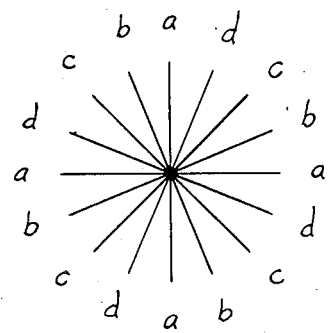
Fig. 7
Fig. 4
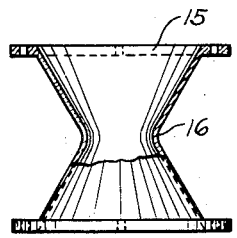
Fig. 5
Fig. 6
INVENTOR.
R.A. Blunt.
BY
Thomas W.J. Clark
ATTORNEY.

Patented Oct. 16, 1934

1,977,300

UNITED STATES PATENT OFFICE 1,977,300

SEGREGATION ELIMINATOR

Royden A. Blunt, Baltimore, Md.

Application August 30, 1932, Serial No. 631,011

5 Claims. (Cl. 259—4)

My invention relates to a segregation eliminator. Most plants using bulk materials which need to be properly mixed for processing can do this very readily, but it has always been a problem to make them stay mixed, especially when the materials are of various sizes.

In glass plants particularly it is very desirable, on account of the economies involved, to receive and mix materials directly at one point and convey them to storage tanks located above the furnaces in which the materials are to be melted. All engineers know that mixed materials when transported over belt conveyors or other conveyors and then discharged into storage tanks become unmixed and a condition called segregation results, that is, the alkali which is generally in the form of course crystals of soda ash are generally somewhat larger than the silica sand which is generally quite fine. Ground burned lime and finely pulverized feldspar are also used in this batch and the tendency is for the finer materials to separate from the courser materials and there are localized conditions throughout the charges of batch which come from the storage tanks wherein the fluxes are separated from close contact with the silica which they are supposed to flux. In a glass furnace this condition leads to several other undesirable conditions, namely, unmelted grains of silica which have not been properly fluxed pass through. Larger amounts of heat or fuel are necessary when this condition prevails and the most serious difficulty resulting from improper mixing or rather from charging unmixed materials is known as stria or cord.

Everyone familiar with glass practice knows the tremendous difficulties which cordy glass brings about. For instance, when a globule of glass emerges from the furnace, it is probably a mixture of two or more glasses, one of which sets or becomes hard quicker than the others. The machine will automatically blow this glass and in the blowing the harder part of the glass will not stretch in the blowing operation as much or as quickly as that portion which is softer, making a thin sided article or one with a lop-sided bottom, etc. All of these faults are known to glass men and are responsible for probably 75% of the wasted ware in a glass factory.

Recently I conceived the idea of overcoming these troubles by adding something to the present mixing and conveying machinery which would automatically cause the batch materials to be given a thorough and intimate mixing at the point where they are charged into the furnaces, thereby eliminating any chance of segregation before they are melted.

I attain this by the aparatus illustrated in the accompanying drawings, in which, Figure 1 is a side elevation of the charging end of the furnace showing the charging line leading from the batch storage bin.

Fig. 3 is a plan view of a spreading and cutting plate.

Fig. 4 is a sectional view thereof.

Fig. 5 is a partial sectional view of a converging spool.

Fig. 6 is a side elevation of a spreading and cutting plate.

Fig. 7 is a diagrammatic view of the cutting bars through the segregation eliminator illustrated.

Similar numerals refer to similar parts throughout the several views.

Figure 1:
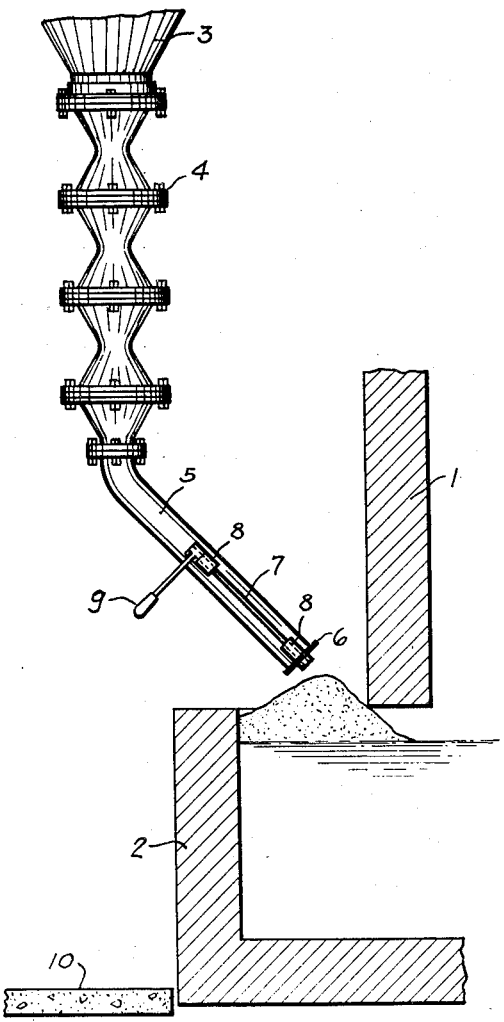

The furnace 1 has a dog house, or charge receiving portion 2. Mixed materials are in the receptacle 3 and they are allowed to fall by gravity through the segregation eliminator generally indicated at 4 to pipe 5. This pipe 5 may have a cut-off valve, as shown in Fig. 1, comprising a plate 6 rigidly bolted at one edge to rod 7 which may be rotated in blocks 8 by handle 9. The material is usually allowed to pile up below the pipe, in the dog house 2, to block the entrance to the furnace and when desired it is pushed down with a pusher by an operator standing on platform 10.

Figure 2:
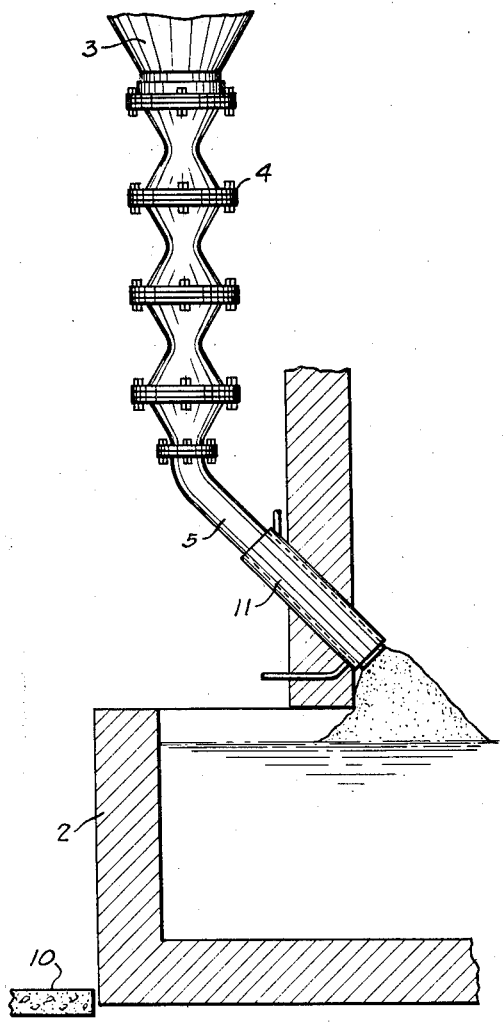
Fig. 2 is a similar view of an alternate apparatus for charging the material to the furnace.

If desired, an automatic feed such as shown in Fig. 2 may be utilized. In this construction pipe 5 has around its lower end a water cooling jacket 11, with water inlet and outlet as shown. This jacketed pipe goes through an opening in the furnace wall and material is banked up to the pipe outlet to stop the material flow. As melted glass is withdrawn from the other end of the furnace, the pile of material floats on the melted glass away from the pipe outlet and allows more material to fall into the furnace.

The segregation eliminator is made up of alternate spools and plates bolted together at their edges and shown in detail in Figs. 3 to 6 inclusive. The plates 12 have four radially directed V shaped bars, 13. At their center these bars are capped by inverted cone 14. The spools 15 are narrowed at their center, as at 16.

I have shown three spools and four plates in Figs. 1 and 2. The bars of the first plate may extend at angles as shown in Fig. 3. The bars of the next plate should then be turned 22½° around, longitudinally of the flow of material, as shown in Fig. 6. The bars of the next plate should be turned 22½° around from those of the second plate, and so on. This angular displacement is shown diagrammatically in Fig. 7, in which the first plate is represented by bars *aaaa*, the second plate by bars *bbbb*, the third plate by bars *cccc* and the fourth plate by bars *dddd*.

As the material comes into contact with the first plate it is spread by cone 14 and cut into separate streams by bars 13, the streams are converged by spool section 16, and allowed to expand immediately thereafter until they are spread and cut again, being cut on other lines, by bars 13 in the next plate. Thus the material has all the segregation that had taken place eliminated and the material enters the furnace thoroughly mixed. The material is allowed to back up in the segregation eliminator, above the outlet. As many spools and plates may be used as desired, and the angles between bars on adjacent plates may be varied as desired.

I have watched the performance of this apparatus in connection with a furnace operation and it is interesting to note that as soon as this segregation eliminator was placed in operation some very bad blister troubles disappeared. I was enabled to run the furnace at a higher capacity and still take out clear and well melted glass. It is also significant that an analysis of the glass showed that the homogeneity was very fine and the glass was exceptionally well melted.

Prior to the installation of this segregation eliminator I could not pack more than 275,000 pounds of glass from this furnace per week without having seeds or specks and other defects show up. When there are no operating troubles, such as interruption of the fuel supply, etc., which cause defects in glass, I have now melted as high as 337,346 pounds of packed ware per week without imperfections from the same furnace. This increase is due largely to improved distribution of the glass in the finished article.

Although I have described my invention in relation to the glass art, it is obvious that it may be used in any art where an intimate intermixture of different materials may be required for processing. Many details of the invention may be changed without departing from the spirit thereof.

What I claim as new and desire to secure by Letters Patent is:

1. In a gravity flow finely divided material segregation eliminator, a source of supply delivering material, stream like, to the same and a processing receptacle receiving material immediately therefrom before any further segregation can take place and a plurality of sets of material stream dividing end supported bars having spaces therebetween, each set being substantially in the same plane and cutting the stream successively longitudinally and means to converge the stream after each cutting by each set of bars.

2. In a segregation eliminator adapted for the flow of material, streamlike, therethrough, a plurality of sets of end supported transverse bars having spaces therebetween, each set being substantially in the same plane and located at successive longitudinal positions within the flow of material in said segregation eliminator, each successive set of bars being placed out of line, longitudinally, with the immediately preceding set, whereby the stream will be cut longitudinally along different lines by successive sets of bars, means to converge the cut stream after each successive cutting by each set of bars.

3. In a segregation eliminator adapted for the flow of material, streamlike, therethrough, a plurality of sets of end support transverse bars having spaces therebetween, each set being substantially in the same plane and located at successive longitudinal positions within the flow of material in said segregation eliminator, each successive set of bars being placed out of line, longitudinally, with the immediately preceding set, whereby the stream will be cut longitudinally along different lines by successive sets of bars, means to spread the stream with each cutting and to converge it after each cutting by each set of bars.

4. In a segregation eliminator adapted for the flow of material, streamlike, therethrough, a plurality of sets of radially extending end supported bars having spaces therebetween and a cone at their center pointing against the flow of material and arranged at successive longitudinal positions within the flow of material in said segregation eliminator, successive sets of bars being rotated on a longitudinal axis to cut the stream on lines, longitudinally, different from those of a preceding set of bars.

5. In a segregation eliminator adapted for the flow of material, streamlike, therethrough, a plurality of sets of radially extending end supported bars having spaces therebetween and a cone at their center pointing against the flow of material and arranged at successive longitudinal positions within the flow of material in said segregation eliminator, successive sets of bars being rotated on a longitudinal axis to cut the stream on lines, longitudinally, different from those of a preceding set of bars and means to converge the cut stream after each cutting thereof by each set of bars.

ROYDEN A. BLUNT.